Oct. 8, 1957          H. TOTAL          2,809,009
AUTOMATIC WEIGHING DEVICE
Filed March 15, 1955          2 Sheets-Sheet 1
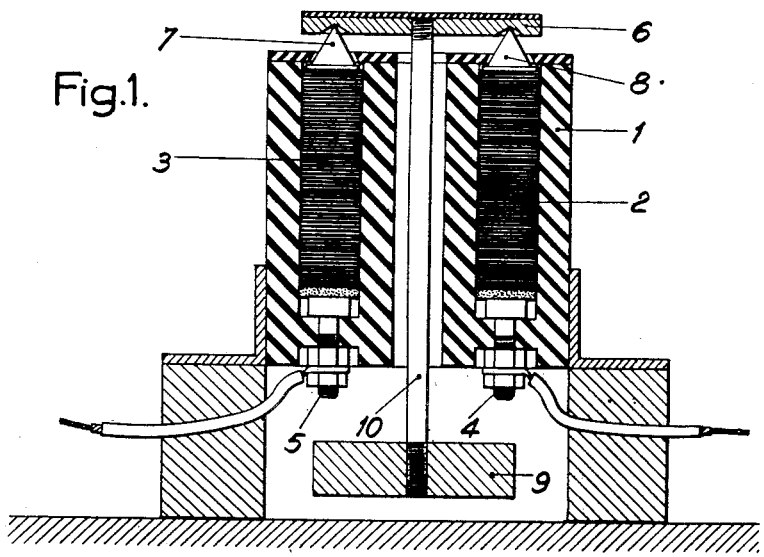
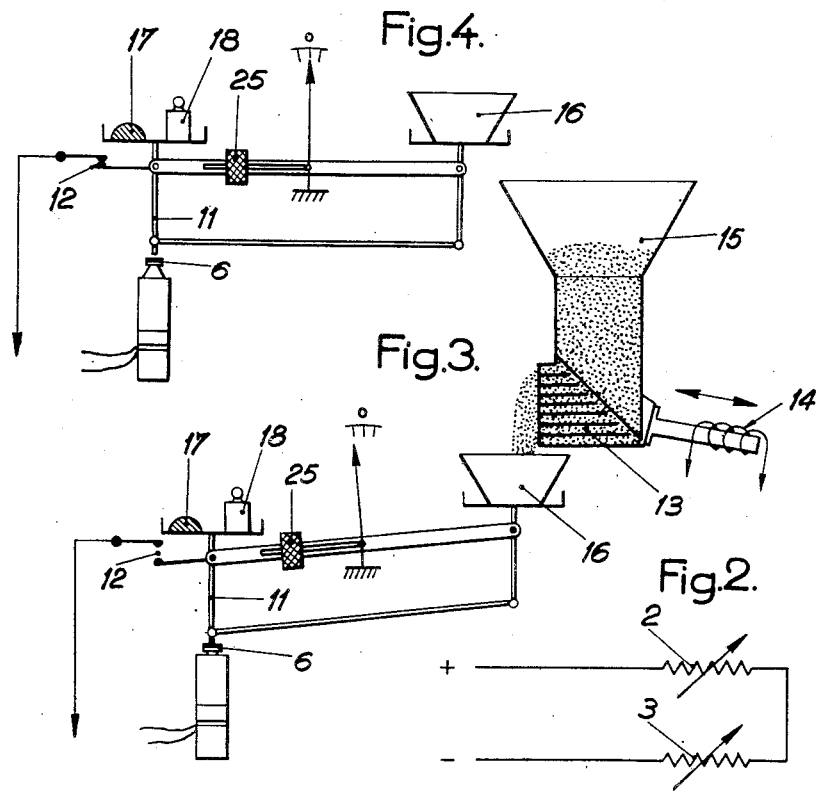

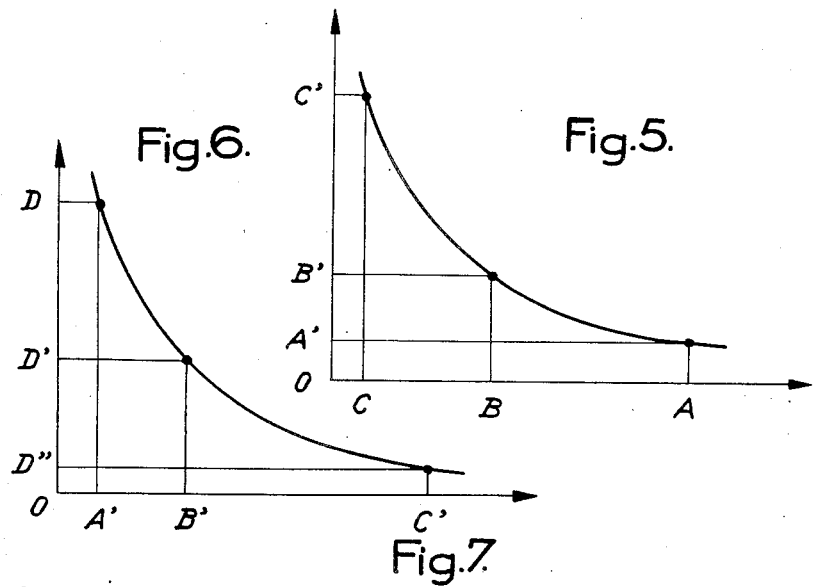

United States Patent Office 2,809,009
Patented Oct. 8, 1957

2,809,009

AUTOMATIC WEIGHING DEVICE

Henri Total, Paris, France, assignor to Societe Anonyme dite: Constructions Industrielles de Precision, Paris, France Application March 15, 1955, Serial No. 494,364

Claims priority, application France March 26, 1954

5 Claims. (Cl. 249—62)

In automatic weighing operations, notably such as are carried out in rapid succession, it is necessary that the delivery of the product to be issued be effected in two or three successive steps, said stepping occurring in one or several weighing systems arranged in series or in parallel, the throughput in each system being constant and the operation of the system being based upon the hit-and-miss principle.

By this method it is possible to deliver the bulk of the material at high rate, then to take up differences from the right weight by feeding the material at a lower rate, whereby eventually the weighing errors are cut down to an acceptable level.

It is well known that such errors as occur in automatic weighing are mainly ascribable to differences in the amounts of make-up material that falls after the delivery has been cut off.

Moreover, when it is intended to deliver unequal amounts of material, the deliveries have to be adjusted individually at each stage of the weighing process.

The subject matter of this invention is a device for the delivery of a definite amount of a liquid or fluent material in which at any time an amount of material is delivered which is only related to the amount of material still to be delivered, the rate of delivery decreasing continuously down to a constant end value.

In said device a pressure-responsive system of variable conductivity mounted in an electric circuit controlling the operation of the distributor is subjected to the vertical thrust of that pan of the scales which carries the weights corresponding to the amount of material to be measured and which is located opposite the one onto which the material is poured, said pan at the end of its upward movement towards the position of balance closing a contact adapted to switch off the current.

Further features and advantages of this invention will be set forth in the following description of a particular embodiment of the same, which is given for the purpose of exemplification yet not of limitation, reference being had to the appended drawing in which:

Figure 1 is a vertical cross-sectional view of the variable conductivity system.

Figure 2 is a diagram showing the arrangement of the system.

Figure 3 illustrates the device during the delivery of the product.

Figure 4 shows part of the device at the completion of the delivery.

Figure 5 is a diagram showing how the resistance of the variable-conductivity system varies depending on the pressure to which said system is subjected.

Figure 6 is a diagram showing how the delivery varies depending on the resistance of the variable-conductivity system.

Figure 7 is a wiring diagram.

As shown in Fig. 1, the system includes a pair of column 2, 3 made up of piled up carbon discs and housed in an insulating block 1. Electrical connection is provided at the bottom end of each disc pile by screws 4 and 5. The discs in each pile are pressed together by means of a plate 6 bearing on a pair of pushes 7, 8 which at the same time provide for electric connection since both the plate and the pair of pushes are conductive. A definite pressure is set upon the two piles by means of a ballast 9 connected through a rod 10 with the plate 6.

As shown in Fig. 3 the whole issuing apparatus includes a balance, e. g. of the Roberval's type, of which the weight-supporting rod 11 is provided with an insulated downward extension adapted consequent to the action of the weights 18 to exert a pressure upon the plate 6 in the system shown in Fig. 1.

A contact 12 comprises a fixed member and a movable member carried by the beam and earthed therethrough. Contact 12 is closed in the horizontal position of the beam, the position of balance, the pointer then standing across the zero of the scale as shown in Fig. 4. In the said position of the beam the rod 11 is located at a slightly higher level than plate 6.

The fluent material in the hopper 15 is poured into the receptacle 16 laid on the opposite pan of the scale through a distributor 13 which as shown in Fig. 3 consists of a spout of particular design which is shaked by means of an electromagnet 14; however, some other form of distributor may also be used, e. g. a belt conveyor, whereby the flow of material may be controlled.

Said receptacle 16 may belong to the balance and its emptying may be effected automatically at the end of the weighing process by mechanical or electro-magnetical means.

As shown in the wiring diagram in Fig. 7 the distributor-actuating electromagnet 14 is fed through a circuit controlled by a switch 23. Connected in the dephasing branch of a thyratron 19 which in turn is connected in said circuit are the system 2, 3 and a capacity 20. The switch 23 is actuated by a relay 22 fed by a circuit controlled by a switch 21. Connected in said circuit are a contact 12 and an electronic tube 24.

The operation is as follows:

Firstly, with the aid of a counterweight 17, the balance is set in its position of equipoise where the pointer stands in register with the zero mark of the scale; a weight 18 corresponding to the amount of material to be delivered is then laid on the aforesaid pan.

The beam is thereby swung out of balance, which causes the rod 11 to exert a force upon plate 6 which is proportional to the weight 18 plus the ballast 9.

It is well known that the electric resistivity of a pile made up of carbon discs is dependent on the pressure exerted upon said pile. Consequently, the resistance of the system 2, 3 will vary in dependency on the aforesaid pressure. A value OA of said pressure as shown in the diagrammatical Fig. 5 will correspond to a value OA' of the electrical resistance.

The resistor system 2, 3 connected in series with the capacitor 20 in the dephasing grid circuit of thyratron 19 dephases the voltage applied to the grid relative to the feed voltage.

The distributor is set into operation by means of the switch 21 through which relay 22 is brought to operating position in which it is maintained by means of the electronic tube 24.

Relay 22 in its operating position closes the switch 23 of the feed circuit for electromagnet 14. The current through said circuit bears a relation to the dephasing of the grid voltage of the thyratron 19 and consequently to the weight 18 laid on the balance pan plus the weight of the ballast 9. Consequently, as shown in the diagram represented in Fig. 6, an initial output OD corresponds to the resistance OA' indicated in Fig. 5.

In proportion as the product is delivered the amount collected in the receptacle 16 lessens the pressure A which, towards the end of the weighing process as the rod 11 disengages the plate 6, sinks down to the value C indicated in Fig. 5 which value corresponds to the mere action of the ballast 9.

To the aforesaid pressure C corresponds a high resistance and a low delivery rate D" which remains constant until the contact 12 is closed once more consequent to the balance reassuming its position of equilibrium.

Upon the said contact 12 being closed the current through the electronic tube 24 is cut off and the relay 22 falls while opening the switch 23 controlling the circuit for the energization of the electromagnet 14 which actuates the distributor 13.

Consequently, the initial value of the delivery is set by the weight of the material to be issued while the final value is set by the ballast 9, the rate of delivery varying continuously between said values.

If the amount to be delivered is changed, for instance lessened, the initial pressure drops to the value B while giving an initial resistance B' and an initial delivery rate D'. The delivery rate varies according to the same law and reaches the same lower value D".

In operating the device it is only necessary to pre-load the same in accordance with the weight of material to be delivered and to close the switch 21. However, the momentum of the falling material, as well as the variation of level within the receptacle at the completion of the weighing process depending on the amount delivered, require the use of a compensator 25 known per se. In the adjustment of the said compensator the particular and well-known fact should be taken into account that the amount of excess material that goes on flowing is dependent on the drop.

What I claim is:

1. A device for the delivery of a definite weight of a fluent material which includes weighing means comprising a material receiving pan and a weight-carrying pan to offset said definite weight of material, means to discharge the material onto the material receiving pan, an electric circuit to control the action of said material-discharging means, said circuit being fed with a current of predetermined value and causing the material to be delivered at a rate directly proportional to said intensity, a resistor system whose conductivity varies in direct relation to the pressure imposed thereupon, connected in said circuit, subjected to the weighing action of said weight-carrying pan and inserted in said circuit, whereby said resistor system causes said current and the delivery rate of the material to decrease with the weighing action of the weight-carrying pan, a switch in said circuit, and means responsive to the movement of said weight-carrying pan to open said switch as the weight-carrying pan starts its upward movement to its position of balance.

2. A material-delivering device as claimed in claim 1 wherein the resistor system consists of piles of carbon discs standing side by side and connected in series in the control circuit.

3. A device for the delivery of a definite weight of a fluent material which includes weighing means comprising a material receiving pan and a weight carrying pan to offset said definite weight of material, means to discharge the material onto the material receiving pan, an electric circuit to control the action of said material discharging means, said circuit being fed with a current of predetermined value and causing the material to be delivered at a rate directly proportional to said intensity, a resistor system whose conductivity varies in direct relation to the pressure imposed thereupon, connected in said circuit, subjected to the weighing action of said weight-carrying pan and inserted in said circuit, whereby said resistor system causes said intensity and the delivery rate of the material to decrease with the weighing action of the weight-carrying pan, a weighing ballast exerting a constant weighing action upon said resistor system in addition to the weighing action of said weight-carrying pan, a switch inserted in said circuit and means responsive to the movement of said weight-carrying pan and opening said switch as the weight-carrying pan reaches upwards its position of balance, whereby said switch will stop the delivery of the material when said delivery has been reduced to a rate corresponding to the only weighing action of said weighing ballast upon said resistor system.

4. A device for the delivery of a definite weight of a fluent material which includes weighing means comprising a material receiving pan and a weight-carrying pan to offset said definite weight of material, means to discharge the material onto the material-receiving pan, an electric circuit to control the action of said material-discharging means, said circuit being fed with a constant A.-C. voltage, a thyratron including an anode and a grid, connected in said circuit, said circuit comprising an anode connection and a grid voltage dephasing connection, a resistor system whose conductivity varies in direct relation to the pressure imposed thereupon, subjected to the weighing action of said weight-carrying pan and mounted in said thyratron grid voltage dephasing connection, a capacitor mounted in series with said resistor system in said grid voltage dephasing connection, a control coil for the material delivering device mounted in said anode connection, said coil being adapted to be energized with A.-C. the intensity of which decreases in direct relation to the thrust exerted by said weight-carrying pan upon said resistor system, whereby said current causes the material-discharging means to allow material to flow at a rate which decreases continuously until no more thrust is exerted upon said system by said pan, a switch inserted in the anode connection of the thyratron between said anode and said control coil, and means responsive to the movement of said weight-carrying pan and opening said switch as the weight-carrying pan starts its upward movements to its position of balance.

5. A device for the delivery of a definite weight of a fluent material which includes weighing means comprising a material-receiving pan and a weight-carrying pan to offset said definite weight of material, an electric circuit fed with a current of a predetermined value causing the material to be delivered at a rate directly proportional to said intensity, a resistor system whose conductivity varies in direct relation to the pressure imposed thereupon, subjected to the weighing action of said weight-carrying pan and mounted in said circuit, whereby said resistor system causes said intensity and the delivery rate of the material to decrease with the weighing action of the weight-carrying pan, a switch inserted in said circuit, another circuit including an A.-C. feed switch to be closed to initiate the delivery of the material, a relay which in its energized condition keeps the switch of said first circuit in its closed position, an electron tube which in its energized condition keeps said relay energized, and a contact which in its closed position cuts the energization of said electron tube, thus discontinuing the energization of said relay, snapping the switch of said first circuit to its open position and stopping the delivery of the material, and means responsive to the movement of said weight-carrying pan and closing said contact as said weight-carrying pan starts its upward movement to its position of balance.

References Cited in the file of this patent

UNITED STATES PATENTS

| 2,597,831 | Willis | May 20, 1952 |
| 2,634,080 | Knobel | Apr. 7, 1953 |

FOREIGN PATENTS

| 457,295 | Great Britain | Nov. 25, 1936 |